«12» United States Patent
Juntunen et al.

(10) Patent No.: US 10,608,698 B2
(45) Date of Patent: *Mar. 31, 2020

(54) SYSTEM, APPARATUS AND METHOD FOR SYNCHRONIZING COMMUNICATIONS BETWEEN DEVICES

(71) Applicant: Ademco Inc., Golden Valley, MN (US)

(72) Inventors: Robert Juntunen, Minnetonka, MN (US); Steven Nichols, Plymouth, MN (US); Kenneth Kidder, Coon Rapids, MN (US)

(73) Assignee: Ademco Inc., Golden Valley, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/649,035

(22) Filed: Jul. 13, 2017

(65) Prior Publication Data

US 2017/0310359 A1    Oct. 26, 2017

Related U.S. Application Data

(63) Continuation of application No. 12/564,682, filed on Sep. 22, 2009, now Pat. No. 9,735,831.

(51) Int. Cl.
*H04B 1/7156* (2011.01)
*H04B 1/713* (2011.01)
*H04J 3/06* (2006.01)
*H04W 56/00* (2009.01)

(52) U.S. Cl.
CPC .......... *H04B 1/7156* (2013.01); *H04B 1/713* (2013.01); *H04J 3/0658* (2013.01); *H04J 3/0667* (2013.01); *H04W 56/00* (2013.01); *H04B 2001/71563* (2013.01)

(58) Field of Classification Search
CPC ..... H04B 1/713; H04B 1/7156; H04J 3/0658; H04J 3/0667
See application file for complete search history.

(56) References Cited

U.S. PATENT DOCUMENTS

| | | | |
|---|---|---|---|
| 4,677,617 A * | 6/1987 | O'Connor | H04B 1/7156 370/436 |
| 5,463,659 A | 10/1995 | Nealon et al. | |
| 5,758,290 A | 5/1998 | Nealon et al. | |
| 5,852,630 A | 12/1998 | Langberg et al. | |
| 5,927,599 A | 7/1999 | Kath | |
| 6,028,885 A | 2/2000 | Minarik et al. | |
| 6,195,712 B1 | 2/2001 | Pawlowski et al. | |
| 6,213,404 B1 | 4/2001 | Dushane et al. | |
| 6,295,541 B1 | 9/2001 | Bodnar et al. | |

(Continued)

OTHER PUBLICATIONS

Prosecution History from U.S. Appl. No. 12/564,682, dated Dec. 7, 2011 through Apr. 11, 2017, 313 pp.

*Primary Examiner* — Joe Chacko
(74) *Attorney, Agent, or Firm* — Shumaker & Sieffert, P.A.

(57) ABSTRACT

Systems, apparatuses and methods for synchronizing communication actions between multiple communication devices by accounting for discrepancies between timing functionality in communicating devices. A time value indicative of a remote device's view of current time is received. Where it is determined that the time value differs from a locally generated view of current time by at least an established amount, the range of time in which communications signals with the remote device will be monitored and transmitted is extended.

8 Claims, 10 Drawing Sheets

(56) References Cited

U.S. PATENT DOCUMENTS

| | | |
|---|---|---|
| 6,700,920 B1 | 3/2004 | Partyka |
| 6,778,902 B2 | 8/2004 | Hathiram et al. |
| 6,859,450 B1 | 2/2005 | Mansfield |
| 6,870,875 B1 | 3/2005 | Partyka |
| 6,925,105 B1 | 8/2005 | Partyka |
| 7,035,310 B1 | 4/2006 | Roberts |
| 7,050,906 B2 | 5/2006 | Hathiram et al. |
| 7,061,428 B1 | 6/2006 | Amir et al. |
| 7,224,713 B2 | 5/2007 | Partyka |
| 7,301,986 B2 | 11/2007 | Partyka |
| 7,330,736 B2 | 2/2008 | Redi |
| 7,664,553 B2 | 2/2010 | Roberts |
| 8,255,754 B2 | 8/2012 | Tsfati et al. |
| 8,259,775 B1 | 9/2012 | Nichols |
| 8,385,384 B1 | 2/2013 | Kidder et al. |
| 8,553,743 B1 | 10/2013 | Nichols et al. |
| 8,677,342 B1 | 3/2014 | Kidder et al. |
| 8,891,586 B1 | 11/2014 | Nichols |
| 9,210,125 B1 | 12/2015 | Nichols |
| 9,735,831 B1 | 8/2017 | Juntunen et al. |
| 2001/0004375 A1 | 6/2001 | Partyka |
| 2002/0136335 A1* | 9/2002 | Liou ............ H04J 3/0667 375/354 |
| 2003/0198245 A1 | 10/2003 | Bradford et al. |
| 2004/0202229 A1 | 10/2004 | Raphaeli et al. |
| 2004/0223515 A1 | 11/2004 | Rygielski et al. |
| 2005/0003794 A1 | 1/2005 | Liu |
| 2005/0047383 A1 | 3/2005 | Yoshida |
| 2005/0170868 A1 | 8/2005 | Fischer |
| 2006/0227852 A1 | 10/2006 | Black et al. |
| 2007/0093975 A1 | 4/2007 | Hoogenboom |
| 2007/0135179 A1 | 6/2007 | Hardman et al. |
| 2007/0139183 A1 | 6/2007 | Kates |
| 2007/0291822 A1 | 12/2007 | Staley et al. |
| 2008/0219324 A1 | 9/2008 | Park et al. |
| 2008/0267259 A1 | 10/2008 | Budampati et al. |
| 2009/0100189 A1 | 4/2009 | Bahren et al. |
| 2010/0007521 A1 | 1/2010 | Cornwall |
| 2010/0054283 A1* | 3/2010 | Jin ............ H04J 3/0664 370/503 |
| 2010/0182981 A1* | 7/2010 | Thoukydides ........ H04J 3/0658 370/336 |

\* cited by examiner

SYSTEM, APPARATUS AND METHOD FOR SYNCHRONIZING COMMUNICATIONS BETWEEN DEVICES

This is a continuation of co-pending U.S. patent application Ser. No. 12/564,682, filed Sep. 22, 2009, and entitled "SYSTEM, APPARATUS AND METHOD FOR SYNCHRONIZING COMMUNICATIONS BETWEEN DEVICES", which is incorporated herein by reference.

FIELD OF THE INVENTION

This invention relates in general to communications, and more particularly to systems, apparatuses and methods for synchronizing communication actions between multiple communication devices.

BACKGROUND OF THE INVENTION

Systems employing numerous devices often require or otherwise benefit from the ability for these devices to communicate with one another. While each device may have its own purpose and responsibilities, they may need to transmit information to, and/or receive information from, other devices of the system. Device-to-device communication may be accomplished by wiring the devices together, and communicating via the wires. Systems today are continually moving towards wireless communication, which generally makes installation more convenient, and among other things provides greater flexibility and scalability.

Whether devices communicate wirelessly or otherwise, the communicating devices may communicate at some time that is made known to each of the communicating devices. For example, if a sending device is to send a message to a targeted receiving device(s) at a particular time or when a particular event occurs, and the targeted receiving device(s) is to monitor for the message at that particular time or when the event occurs, then the communicating devices may need to have a cooperative reference of time.

A more particular scenario is provided. One drawback to wireless communication is that information transfer is not confined to a wire, as in a direct wired system. Rather, the information is transmitted over the air, and transmissions from neighboring systems can interfere with system communications. To address this issue, wireless network systems have employed various methods of transmitting radio signals, such as frequency hopping. Frequency hopping generally refers to a modulation technique where the signal carrier is rapidly switched among many frequency channels. Each party to the communication must know the frequency hopping sequence in order to know when it is to transmit at a certain frequency in the sequence. Using the frequency hopping sequence, transmitting devices can properly address targeted devices, and receiving devices can reject information from neighboring devices that are not within their system but within their reception range. However, to know when the particular communication frequency will be active, both the transmitting and receiving devices may need to utilize a timer(s) or other timing functionality. Imprecise component tolerances in the various communication devices will lead to relative timing imprecisions in determining when the communication devices should monitor for incoming messages and/or signal outgoing message transmissions. These imprecisions can lead to communication errors.

Accordingly, there is a need in the communications industry for systems and methods for recognizing discrepancies in relative timing between communicating devices, and taking action to correct or otherwise account for such discrepancies to maintain proper communication functionality. It is also beneficial to iteratively increase the accuracy between the timing functionality of the communicating devices. The present invention fulfills these and other needs, and offers other advantages over the prior art.

SUMMARY

To overcome limitations in the prior art described above, and to overcome other limitations that will become apparent upon reading and understanding the present specification, the present invention discloses systems, apparatuses and methods for synchronizing communication actions between multiple communication devices.

In accordance with one embodiment, a method is provided for accounting for discrepancies between timing functionality in communicating devices. A time value indicative of a remote device's view of current time is received. Where it is determined that the time value differs from a locally generated view of current time by at least an established amount, the range of time in which communications signals with the remote device will be monitored and transmitted is extended.

According to more particular embodiments of such a method, extending the range of time involves initiating monitoring for incoming signals at a time earlier than an expected start time as determined from the locally generated view of current time. In another embodiment, extending the range of time involves discontinuing monitoring of incoming signals at a time later than an expected termination time as determined from the locally generated view of current time. According to more particular embodiments of such a method, extending the range of time involves both initiating monitoring for incoming signals at a time earlier than an expected start time as determined from the locally generated view of current time, and discontinuing monitoring of the incoming signals at a time later than an expected termination time as determined from the locally generated view of current time.

According to still other particular embodiments of such a method, extending the range of time involves initiating transmission of a message preamble for outgoing signals at a time earlier than an expected start time as determined from the locally generated view of current time. In another embodiment, extending the range of time involves discontinuing transmission of a message preamble for outgoing signals at a time later than an expected termination time as determined from the locally generated view of current time. In still another embodiment, extending the range of time involves both initiating transmission of a message preamble for outgoing signals at a time earlier than an expected start time as determined from the locally generated view of current time, and discontinuing transmission of the message preamble at a time later than an expected termination time as determined from the locally generated view of current time.

According to a particular embodiment of such a method, extending the range of time involves initiating monitoring for incoming signals at a time earlier than an expected monitoring start time as determined from the locally generated view of current time, discontinuing monitoring of the incoming signals at a time later than an expected monitoring termination time as determined from the locally generated view of current time, initiating transmission of a message preamble for outgoing signals at a time earlier than an expected transmission start time as determined from the locally generated view of current time, and discontinuing transmission of the message preamble at a time later than an expected transmission termination time as determined from the locally generated view of current time.

According to yet another particular embodiment, receiving the time value involves receiving a representation of a current time generated by a local timer of the remote device.

In another embodiment of such a method, determining that the time value differs from a locally generated view of current time involves comparing the received time value to the locally generated view of current time, and determining whether a difference between the received time value and the locally generated view of current time is at least the established amount. In a still more particular embodiment, the difference between the received time value and the locally generated view of current time is a result of at least a deviation between local clock circuitry and remote clock circuitry of the remote device.

According to yet another embodiment, the method further involves creating the locally generated view of current time using values from a timer local to a device that receives the time value from the remote device.

In accordance with another embodiment, a method is provided that includes a client device periodically receiving synchronization messages originating at a remote device, where the synchronization messages includes a time value corresponding to the remote device's representation of current time and a synchronization time value corresponding to the time at which a prior synchronization occurred between the client device and the remote device. If a predetermined number of the synchronization messages are received at the client device (e.g., consecutively; some determined percentage; etc.), it monitors for incoming messages from the remote device and transmits outgoing messages to the remote device when the client device determines that a communication frequency is active. If the predetermined number of the synchronization messages are not received at the client device, it monitors for the incoming messages and transmits the outgoing messages from a time prior to when it determines that the communication frequency is active and until a time beyond when it determines that the communication frequency is active.

According to a more particular embodiment, the method further involves determining whether the predetermined number of the synchronization messages are consecutively received. In such case, if the predetermined number of the synchronization messages are consecutively received at the client device, the client device monitors for the incoming messages from the remote device and transmits the outgoing messages to the remote device when the client device determines that the communication frequency is active. If the predetermined number of the synchronization messages are not consecutively received at the client device, the client device monitors for the incoming messages and transmits the outgoing messages from a time prior to when the client device determines that the communication frequency is active and until a time beyond when the client device determines that the communication frequency is active.

According to another particular embodiment, the method further involves adjusting a local timer at the client device to account for timing differences between the client device and the remote device.

In yet another embodiment, the method further involves returning to monitoring for the incoming messages and transmitting the outgoing messages when the client device determines that the communication frequency is active, when the predetermined number of the synchronization messages are again consecutively received at the client device.

In accordance with another embodiment of the invention, an apparatus is provided that includes a local timing module configured to generate a local representation of current time, and a receiver coupled to wirelessly receive a remote device's representation of current time. A processor is configured to compare the local and remote representations of current time, and in response to determining that the local and remote representations of current time differ by at least a predetermined amount, to extend the range of time in which communications signals with the remote device will be communicated.

According to a more particular embodiment, the apparatus further includes a sleep control module configured to awaken the apparatus for communication during the extended range of time in which communication signals with the remote device will be communicated.

In accordance with another embodiment of the invention, a system is provided that includes at least one remote device and at least one local device. The remote device includes a remote timing module configured to generate a remote representation of current time, and a transmitter configured to wirelessly transmit a time value indicative of the remote representation of current time. The local device includes a local timing module configured to generate a local representation of current time and a receiver coupled to wirelessly receive the time value from the remote device. The local device further includes a processor configured to compare the time value and the local representation of current time, and in response to determining that the time value and the local representation of current time differ by at least a predetermined amount, extending the range of time in which communications signals with the remote device will be communicated.

The above summary of the invention is not intended to describe every embodiment or implementation of the present invention. Rather, attention is directed to the following figures and description which sets forth representative embodiments of the invention.

BRIEF DESCRIPTION OF THE DRAWINGS

The invention is described in connection with the embodiments illustrated in the following diagrams.

DETAILED DESCRIPTION

Figure 1:
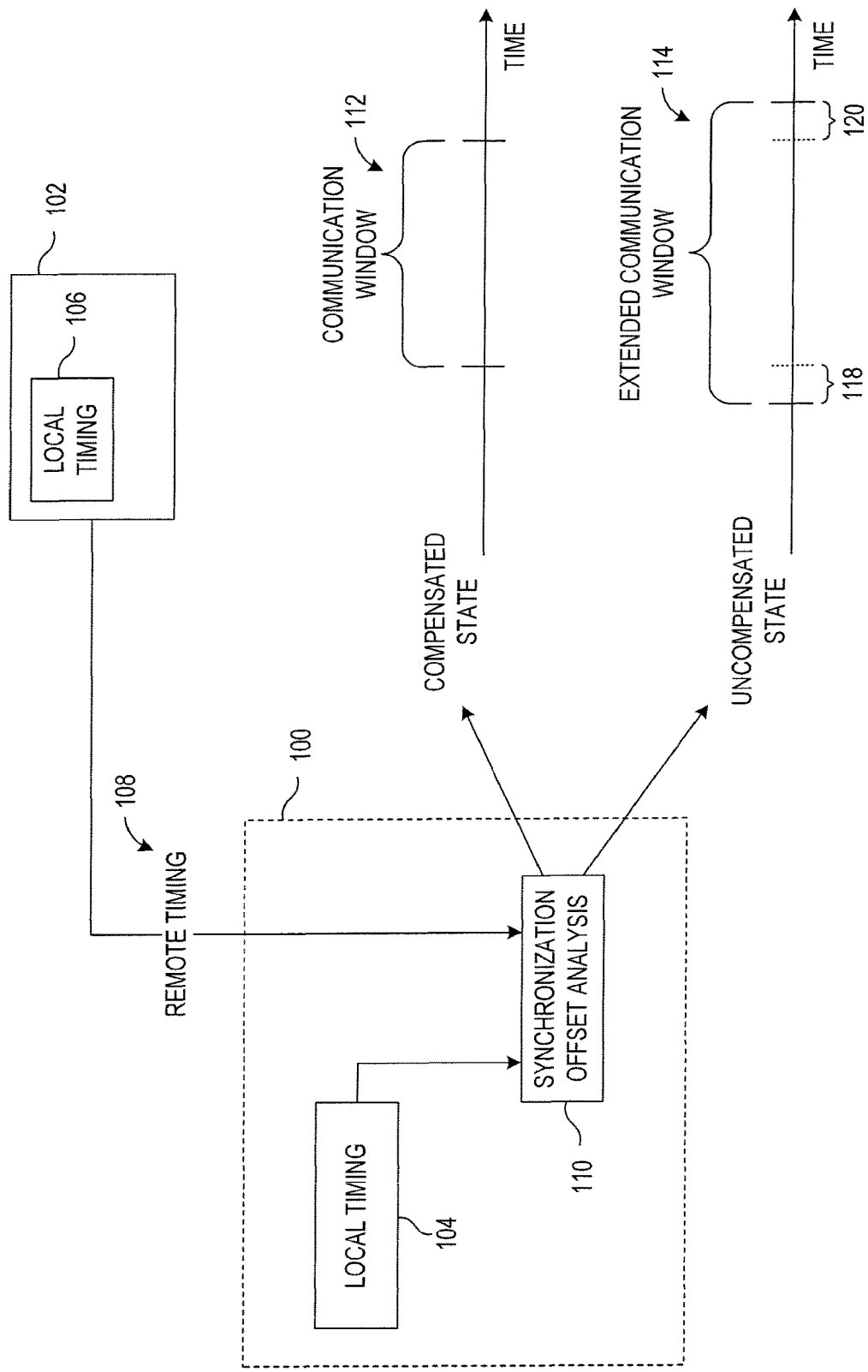
FIG. 1 is a diagram generally illustrating a representative manner of providing an extended communication window to allow errors or discrepancies in synchronization to be removed to enable proper communication of time-dependent messages.

In the following description of various exemplary embodiments, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

As will be apparent to those skilled in the art from the description provided herein, embodiments of the invention may be used in any situation where synchronization between communicating devices may be desired or required, such as where messages are communicated wirelessly via one or more dedicated frequencies or a sequence(s) of frequencies as in the case of frequency hopping. The invention is also applicable to other channel access methods such as frequency division multiplexing, time division multiplexing, code division multiple access, and/or any other communication methodology where the timing between communicating devices may involve synchronization therebetween.

Generally, the present invention relates to facilitating communication between multiple devices. One aspect of the invention involves coordinating synchronization timing between multiple devices. In one embodiment, at least a time value indicative of a remote device's view of current time is received. Using at least this time value, it can be determined that the time value differs from a locally generated view of current time by at least some established amount. In response, the range of time in which communication signals with the remote device will be monitored and transmitted is extended. Thus, where the remote and local timers are different by some amount, an extended communication window is utilized at the local device to ensure that it "listens" for incoming messages and signals (e.g., via a message preamble) outgoing messages for an extended time sufficient to account for discrepancies between the remote and local device timers.

More particular embodiments involve communications by way of frequency hopping techniques. Frequency hopping generally refers to a modulation technique where the signal carrier is rapidly switched among many frequency channels, where each device involved in the communication is privy to the frequency hopping sequence in order to know when a particular communication frequency will become active in the sequence. Using the frequency hopping sequence, transmitting devices can properly address targeted devices, and receiving devices can reject information from neighboring devices that are not within their system but within their reception range. In one embodiment, a client device periodically receives synchronization messages originating at a remote device (e.g., the "host" device), where the synchronization messages includes a time value corresponding to the host's representation of current time and a synchronization time value corresponding to the time at which a prior synchronization occurred between the client and host devices. If a predetermined number of the synchronization messages are, in one embodiment, consecutively received at the client device, it monitors for incoming messages from the host and transmits outgoing messages to the host when the client device determines that the relevant communication frequency is active. On the other hand, if the predetermined number of the synchronization messages are not consecutively received at the client device, it monitors for incoming messages from the host and transmits its outgoing messages to the host from a time prior to when the client device determines that the communication frequency is active and until a time beyond when the client device determines that the communication frequency is active. In this manner, an extended communication window is utilized at the client device to ensure that it "listens" for incoming messages, and/or signals (e.g., via a message preamble) outgoing messages for an extended time sufficient to account for discrepancies between the client and host timers, if the client is deemed "unsynchronized" with the host by way of failing to receive the predetermined number of consecutive synchronization messages.

Thus, the invention provides, among other things, a manner for synchronizing actions at multiple devices that operate using their own local clocking mechanisms. For example, battery-powered devices may enter a sleep or other low power consumption mode during periods of relative inactivity, but "awake" at some determined time to exchange information. At least one of the devices (e.g., the "master" device, also referred to herein as the "host" device) is tasked with making information available that coordinates synchronous timing. In one embodiment, one such information item is the time at which a specific synchronization will take place, or alternatively had taken place. Another information item is the master view of current time. Using this information, other client devices can calculate when the next synchronization will take place. Using the current calculation with its own timer, each client can compare the locally calculated synchronization time against what the host's/master's published information indicates the next synchronization time to be. The clients can then employ a dynamic windowing process where they turn on (e.g., awake) earlier and/or stay on later to account for discrepancies in the synchronization times. Successive iterations allow the window openings to be narrowed to conserve as much energy as possible.

More particularly, communicating devices may need to synchronize timing between one another to facilitate communication therebetween. For example, timing for communications between transmitting and receiving devices may need to be coordinated to enable communication endpoints to send and receive data at the same time and/or rate. In serial transmissions, receiving devices may need to be time synchronized to the transmitting devices to ensure that the receiver(s) can recognize information in the order that the transmitter(s) sent them, and/or can know when the information block begins and ends. Additionally, in various embodiments of the present invention, communicating devices may maintain time synchronization to enable them to cooperate on time-dependent operations. For example, time synchronization between transmitting and receiving devices may enable anticipated messages to be sent and/or received at certain time slots of a shared frequency hopping sequence.

Synchronous communication may involve clocking mechanisms to synchronize the signals between the transmitting and receiving devices. Local clocks may be generated using oscillators that oscillate at a particular nominal frequency. In the case of frequency hopping, the transmitting and receiving devices that share a frequency hopping sequence may each utilize such an oscillator to generate its respective local clock signal(s). However, clock signals resulting from each of the oscillators of the various devices typically do not generate precisely corresponding clock signals, due to component and environmental variances in each of the respective oscillators and/or clock signal generation circuitry. For example, temperature differences, component and production imprecisions, effects of component aging and/or other factors may result in differences in the actual frequency generated by different oscillators and their associated clock generation circuits. The deviation due to such factors is commonly referred to as drift, which is often expressed in parts per million (PPM). Thus, the drift value for a particular oscillator identifies the number of additional or lacking oscillations that occur in the time that the oscillator would normally oscillate one million times.

One consequence of local clock differences is that messages communicated between multiple devices may be expected by a receiving device at a time that is different than the time that the sending device sent the message. In other words, clocking differences at the communicating devices may result in message communication that is not completely synchronized between the communicating devices. Among other things, the present invention provides an extended communication window to account for such discrepancies, to enable the devices to properly communicate time-dependent messages.

In one embodiment, the time-dependent messages may be communicated when a receiving device is prepared to receive the message(s). More particularly, it is typically beneficial to conserve energy consumed by AC or DC powered devices. As an example, the service life between battery replacements can be extended by conserving energy consumption of battery powered devices. To conserve power consumption, such devices may enter a sleep mode or other reduced power mode where power consumption is reduced until the device is needed, at which time it will "wake up," or otherwise return to an appropriate operating power. Messages can be communicated when two or more communicating devices are awake, and thus any of the devices in sleep mode should know when to awake in order to receive messages or otherwise engage in communicating with other devices.

FIG. 1 is a diagram generally illustrating a representative manner of providing an extended communication window to allow errors or discrepancies in synchronization to be removed, so that time-dependent messages can be properly communicated. In the embodiment of FIG. 1, it is assumed that a device 100 has undergone a first "synchronization" with another device(s) 102. For example, the device 100 may have requested information from the other device 102, and the device 102 responded with synchronization information. In one embodiment, such synchronization information includes the time at which the next synchronization will occur, and the device's 102 view of current time. When the device 100 first receives this information from the device 102, the device 100 can be considered synchronized with the device 102. However, each of the communicating devices 100, 102 may have their respective clocks/timers running at slightly different speeds as described above. Consequently, by the time that the next synchronization period occurs where the device 102 again provides synchronization information (including the time at which a specific synchronization had taken place, and the device's 102 view of current time), the timing between the two devices 100, 102 may be slightly off. In accordance with the invention, an extended communication window can be utilized at the device 100. The extended communication window enables the device 100 to listen for further synchronization messages and other incoming messages at a point earlier than, and/or for a period longer than, the time that the device 100 would have otherwise monitored for a message from the device 102. In this manner, the device 100 can account for differences in timing between the devices 100, 102. Further, the device 100 can determine the difference in timing between itself and the device 102, and can adjust itself for the next synchronization message.

As shown in FIG. 1, the representative device 100 has its own local timing 104, and the device 102 has its own local timing 106. In response to a request by the device 100, or at the device 102's initiative, remote timing information 108 can be provided to the device 100. This timing information 108 may include, for example, the time at which a synchronization message will occur, and the device 102's view of current time. In one embodiment, the device 102 serves as a host to one or more devices including device 100, in which case the "host" 102 represents the master view of current time. Upon first receiving the remote timing information 108 from the device 102, the timing of device 100 can be considered synchronized with the timing of device 102.

In some cases, the device 100 may expect to receive a message(s) from the device 102 at a certain time. For example, synchronization messages may be periodically or otherwise sent from the device 102 to the device 100 to maintain synchronization between the devices 100, 102. As another example, the device 100 may expect to receive a message, such as a response to a request, at a particular time. For example, the device 100 may expect to receive a response to an inquiry, and the device 100 will listen for the response at the time that a certain frequency of a frequency hopping sequence is active. A synchronization offset analysis 110 at the device 100 can determine whether the local timing 104 differs from the remote timing 108. If the synchronization offset analysis module 110 determines that the timing between the devices is sufficiently synchronized, the devices 100, 102 can be considered to be suitably synchronized and "compensated" as used herein. In this case, the communication window 112 in which the device 100 monitors for incoming messages (e.g. synchronization messages, response messages, etc.) can remain in its normal state. For example, in this case the device 110 can begin monitoring for the message(s) from the device 102 in a time range determined from its local timing 104. An example in a frequency hopping sequence context may be that the device 100 begins monitoring for an expected message when the local timing 104 indicates that the relevant message frequency is active, and ends monitoring for the expected message when the local timing 104 indicates that the active frequency is ending in favor of the next frequency of the frequency hopping sequence.

On the other hand, the synchronization offset analysis 110 may conclude that the timing between the devices is not sufficiently synchronized, and is in an "uncompensated" state. In this case, the communication window is extended 114 at one or both ends of the otherwise standard communication window 112. In one embodiment, the communication window 112 is extended in the uncompensated state by extending the time 118 prior to the start of the standard communication window 112, and extending the time 120 following the end of the standard communication window 112. The extended communication segments 118, 120, resulting in the extended communication window 114, can be applied when the device 100 is transmitting or receiving information to or from the other device 102. Thus, the extended communication window can apply to synchronization messages and/or any other messages that may be sent between communicating devices. In one embodiment, the communication window may be extended such that communicating devices will awaken and/or sleep commensurate with the extended communication window 114.

In one embodiment, the synchronization offset analysis 110 may be accomplished by determining that a consecutive number of messages including the remote timing information 108 have been received. In other embodiments, the analysis may be accomplished by determining that some percentage of messages including the remote timing information 108 has been received. For example, two out of an expected three received messages indicates that the timing between the communicating devices is sufficiently synchronized, or three out of an expected four received messages, etc. The criteria may be a difference between the remote device's 102 local timing 106 and the local device's 100 local timing 104. Thus, while one embodiment of the invention involves the synchronization offset analysis 110 monitoring for some consecutive number of sync messages being received at the device 100, the invention is applicable to other criteria for designating the timing of the communicating devices as sufficiently synchronized.

As described more fully below, the one or more extensions 118, 120 may be based on an expected worst case deviation of the local timing 106 and the local timing 104. For example, this deviation can be determined based on quality specifications of the oscillator and/or timing circuitry associated with the timing modules 104, 106. Where timing components have larger PPM (parts-per-million) deviations, larger windows 118, 120 can be used. Similarly, where timing components have smaller PPM deviations, smaller windows 118, 120 can be used.

Figure 2A:
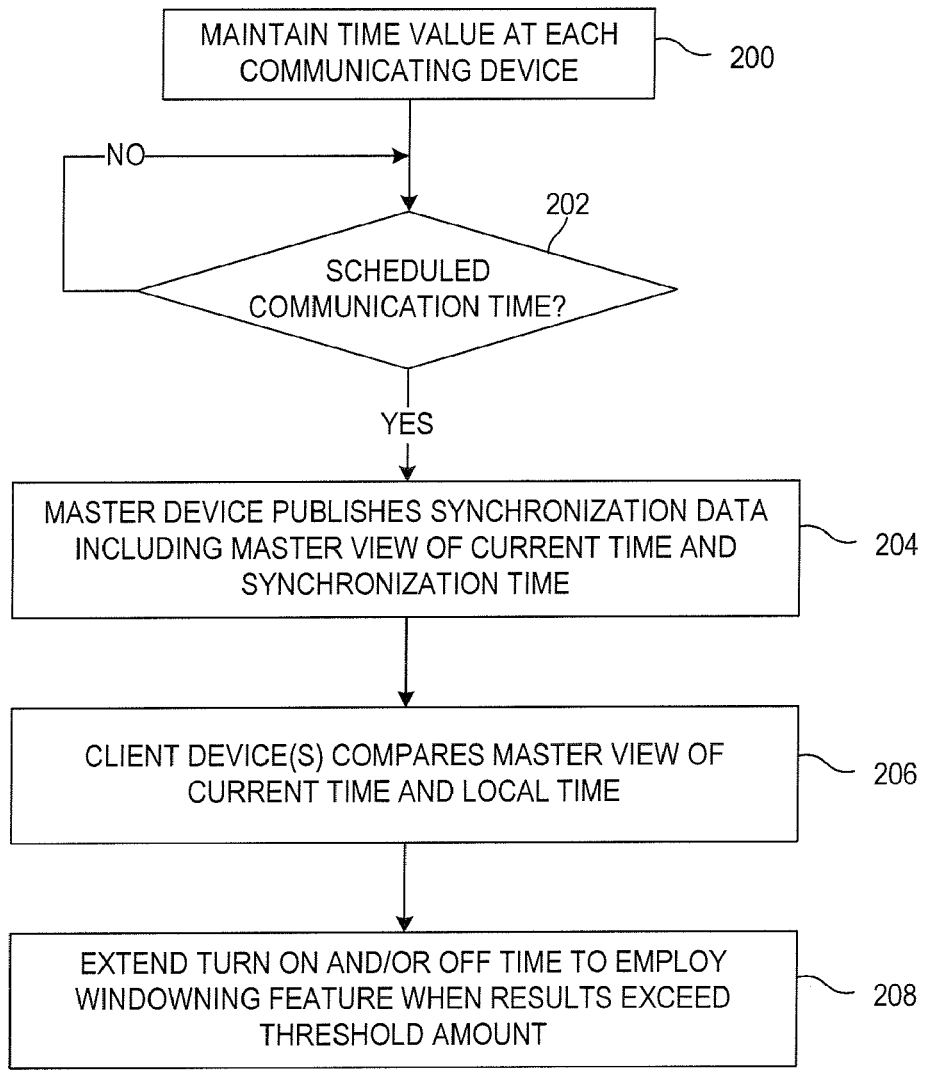
FIGS. 2A and 2B are flow diagrams illustrating representative embodiments of methods for coordinating synchronous timing between devices in accordance with the invention.
Figure 5:
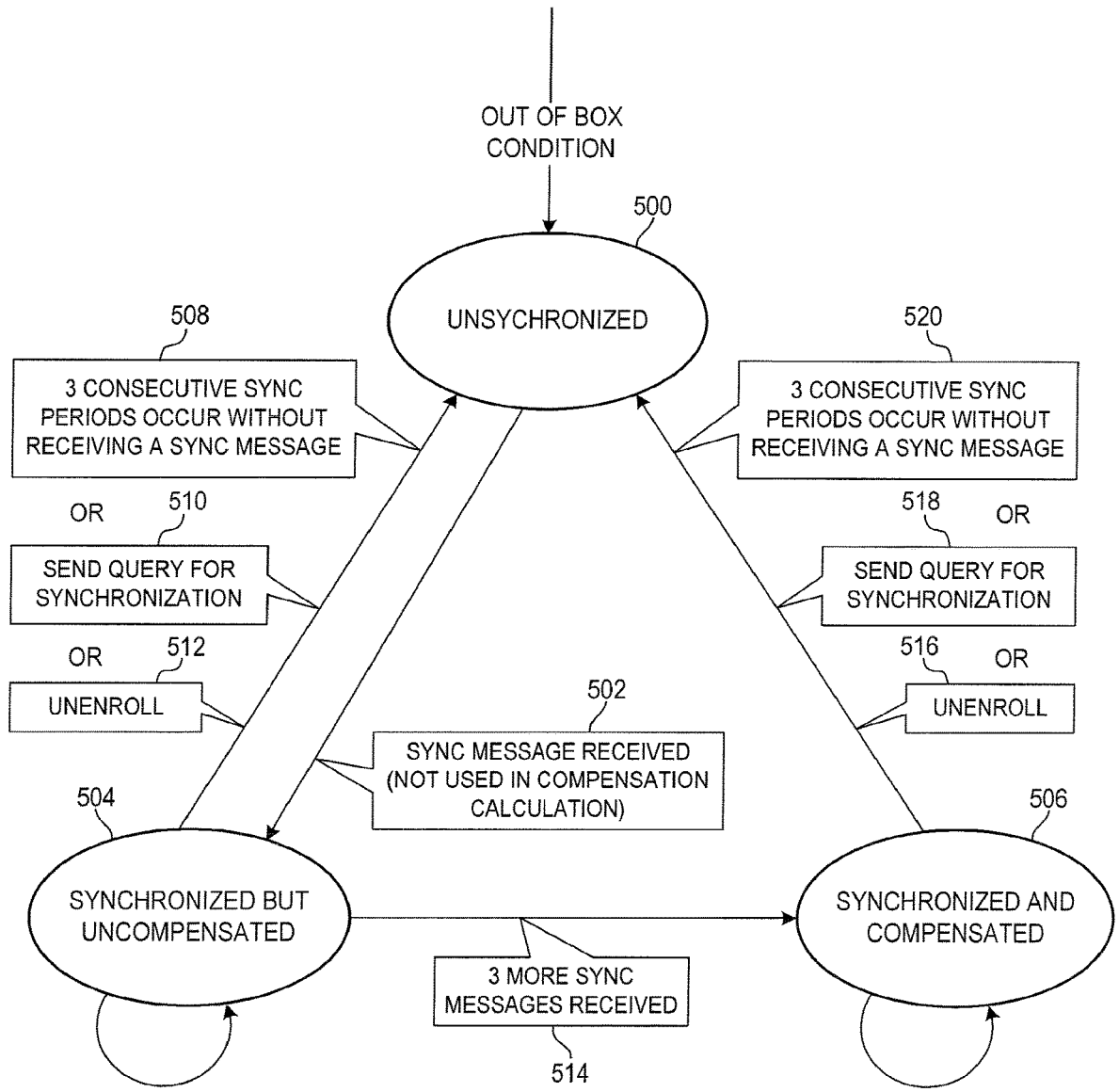
FIG. 5 is a state flow diagram illustrating a representative example of how a client device enters and exits the extended windowing mode in accordance with the present invention.

FIG. 2A is a flow diagram illustrating a representative embodiment of a method for coordinating synchronous timing between devices in accordance with the invention. In the illustrated embodiment, each of the devices involved in the communication maintain 200 their own local timers to provide a respective time value. For each client device, it is determined 202 if a scheduled communication time has arisen, calculated using the client device's local timer. For example, each client device may determine whether it is a determined "wake up" time. If so, the client device(s) receives synchronization data published 204 or otherwise provided by the master (e.g., host) device, which in one embodiment is referred to as the host device. As indicated above, the communicated synchronization data includes the master (e.g., host) view of current time and the synchronization time. For example, the master view of current time refers to what the master's (e.g., host's) local timers believe the current time to be, and the synchronization time refers to the time that the next synchronization will occur (or in some cases, when the last synchronization occurred). The client devices that receive the synchronization information also have local timers running that identify what the respective client believes the current time to be. The client device(s) compares 206 the master view of current time and the locally generated time. As shown at block 208, when the result of the comparison exceeds a threshold amount, the respective client extends the turn on and/or turn off time. For example, in one embodiment, the clients that determine the comparison results to exceed the threshold amount will extend the window for receiving subsequent messages and extend the window for transmitting subsequent messages. In one embodiment, if the comparison 206 indicates that the master view of current time and the client's local time are sufficiently close (i.e., do not exceed the threshold amount 208), then the windowing feature is not employed at that time, and the client's local view of current time is used in determining when to activate its receiving and/or transmitting functionality.

Where the client entered the extended windowing feature 208, it will remain in this extended windowing mode until some defined events occur, embodiments of which are later described in connection with FIG. 5. In one embodiment, being in the extended windowing mode causes the client to extend the time in which it listens for incoming messages from the host device, and to extend the time in which it transmits message preambles when it is attempting to transmit messages to the host device. This can apply to some or all of the messages affecting the client device. For example, in one embodiment, the extended windowing is applied to any incoming message directed from the host to the client, and to any outgoing message directed to the host. Messages from the host to the client may be messages to control the client device, to request information from the client device, to provide information to the client device, or any other data that may need to be communicated from a host device to a client device (including synchronization messages). Messages from the client to the host may similarly include status information, control information, requests, or any other data that may need to be provided to the host. Thus, when in the extended windowing mode, the present invention may be applied to all or any subset of messages communicated between the relevant communication devices.

Figure 2B:
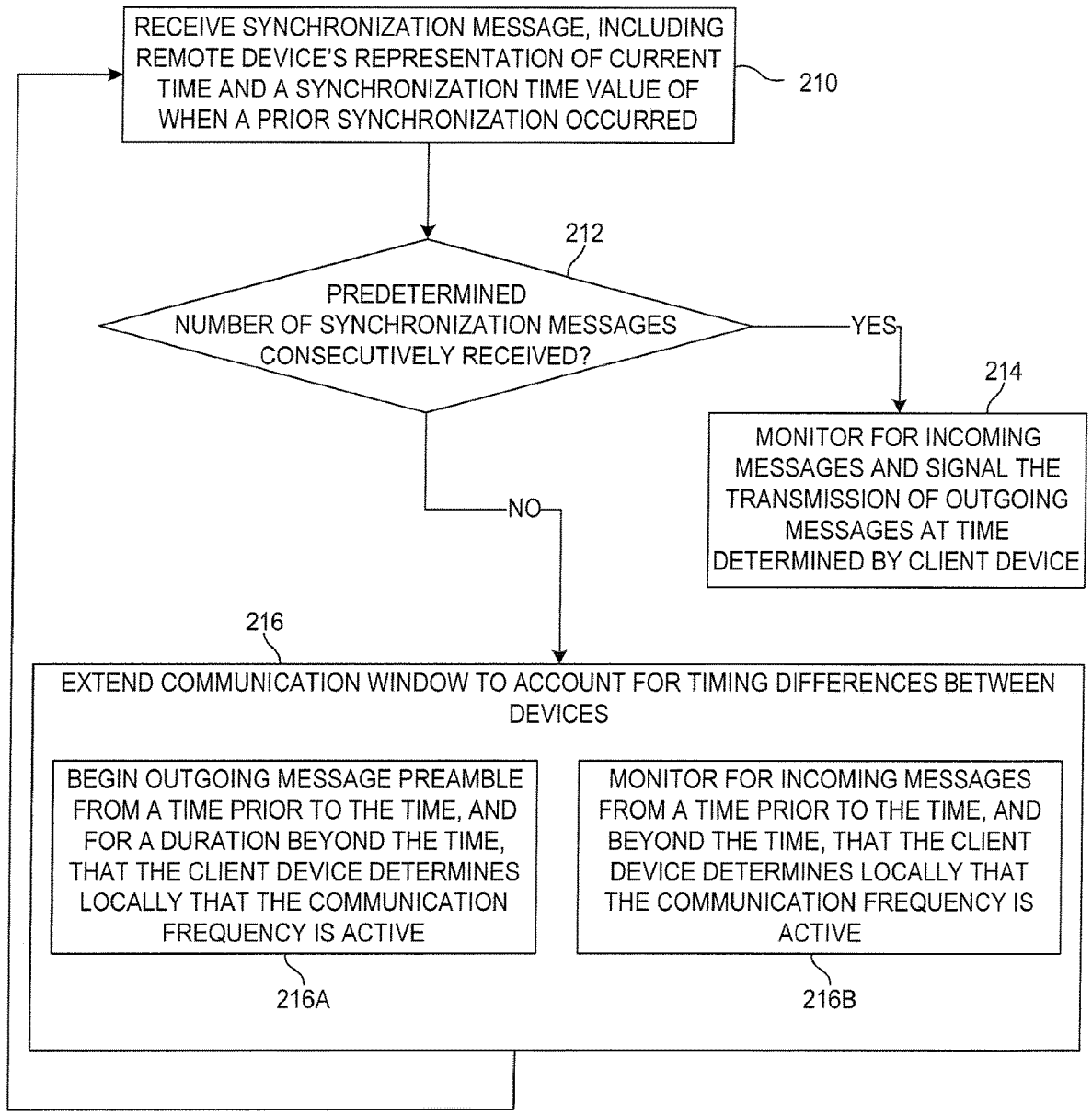

FIG. 2B is a flow diagram illustrating a representative embodiment of a method for coordinating synchronous timing between devices in accordance with the invention. In the illustrated embodiment, the client device receives 210 a synchronization message that includes at least the remote device's representation or "view" of current time, as well as a synchronization time value of when a prior synchronization occurred. If, as determined at block 212, a predetermined number of synchronization messages were consecutively received, the client will monitor for incoming messages and signal the transmission of outgoing messages at a time determined by the client device as shown at block 214.

If, on the other hand, the predetermined number of synchronization messages were not consecutively received by the client device, the client device will utilize an extended communication window 216 to account for timing differences between the devices. For example, when the client device is to send a message(s) to the host device, the client device will begin transmitting its outgoing message preamble from a time prior to the time, and for a duration beyond the time, that the client otherwise locally determines that the communication frequency is active as shown at block 216A. In another example, when the client device is to monitor for an incoming message(s), it will monitor for the message(s) from a time prior to the time, and beyond the time, that the client device otherwise locally determines that the communication frequency is active as shown at block 216B. In this manner, an extended communication window is utilized at the client device to ensure that it "listens" for incoming messages and signals (e.g., via a message preamble) outgoing messages for an extended time sufficient to account for discrepancies between the client and host timers, if the client is deemed "unsynchronized" with the host by way of failing to receive the predetermined number of consecutive synchronization messages.

It should be noted that receipt of consecutive synchronization messages as described in connection with FIG. 2B is just one example of the criteria for determining whether to extend the communication window, but consecutive receipt is not required. For example, receipt of some threshold percentage of synchronization messages in a time period may be used, or any other desired criteria that is indicative of whether the communicating devices are sufficiently synchronized.

Figure 3A:
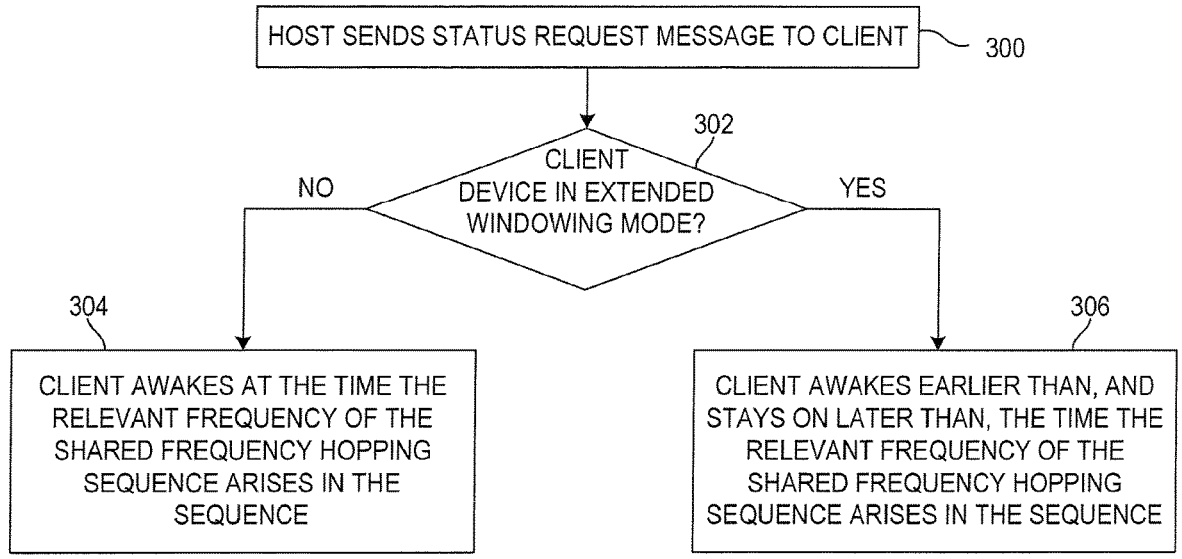
FIGS. 3A and 3B are flow diagrams depicting representative manners in which a client device reacts to incoming messages in view of whether the client device is currently in the extended windowing mode.
Figure 3B:
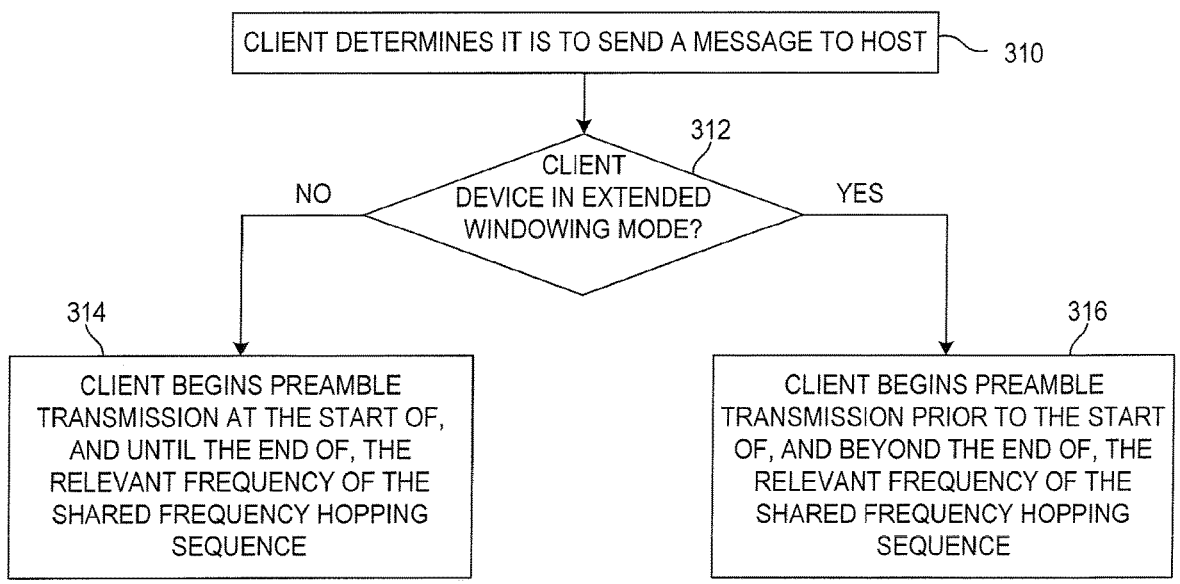

FIGS. 3A and 3B are flow diagrams depicting representative manners in which a client device reacts to incoming messages in view of whether the client device is currently in the extended windowing mode. While the host (master) and client devices may be any devices, for purposes of this example it is assumed the devices are part of a heating, ventilation and air conditioning (HVAC) system. Such environmental control systems may include devices such as thermostats, equipment interfaces, sensors, remote controls, zoning panels, dampers, humidifiers, dehumidifiers, etc. It may be beneficial for some or all of these devices to communicate with each other wirelessly, which significantly eases installation and wiring complications. Wireless units also provide users with flexibility of use, and more options in positioning the devices. These and other advantages of implementing air interfaces have led to the use of the wireless transmission of some data in HVAC systems. Representative examples of such HVAC systems are generally described below, however it should be recognized that the aforementioned systems, apparatuses and methods may be used in any communication device and associated system.

The embodiments of FIGS. 3A and 3B also assume the use of a shared frequency hopping sequence, such that the client device will "awake" when the relevant communication frequency arises in the shared frequency hopping sequence. Thus, at one of the frequencies (which may change) of the frequency hopping sequence, the host device will send a message to the client, and the client will know when, and what frequency, the message will be sent. In general, frequency hopping is used to the extent that transmissions of information and receptions of communicated information take place according to "sequences" of communication frequencies. In one particular embodiment, devices may use a shared frequency hopping sequence for receiving messages that is different than a device-specific frequency hopping sequences used to transmit messages.

One such system and method is described in co-pending application U.S. patent application Ser. No. 12/253,613, filed on Oct. 17, 2008, and entitled "System, Apparatus and Method for Communicating Messages Using Multiple Frequency Hopping Sequences," the content of which is incorporated herein by reference in its entirety.

The embodiment of FIG. 3A is directed to the transmission of a message from a host device (e.g., zoning panel) to a client device (e.g., humidifier). The host sends 300 a message to the client, which in the illustrated embodiment is a status request message. It is determined 302 whether the client is in the extended windowing mode, which could occur in the manner described in connection with FIG. 2A. If the client is not in the extended windowing mode, the client awakes 304 or otherwise becomes active for message receipt at the time the relevant frequency of the shared frequency hopping sequence arises in the sequence based on the client's local timing. On the other hand, if the client is in the extended windowing mode, it awakes 306 or otherwise becomes active for message receipt earlier than, and remains awake/active beyond the end of, the time that the relevant frequency of the shared frequency hopping sequence serves as the communication frequency. In one embodiment, the process of FIG. 3A is used regardless of the type of message received by the client, such as standard operating messages, synchronization messages, etc.

The embodiment of FIG. 3B is directed to the transmission of a message from a client device to a host device. The client determines 310 that it is to transmit a message to the host. It is determined 312 whether the client is in the extended windowing mode, which could occur in the manner described in connection with FIGS. 2A and/or 2B. If the client is not in the extended windowing mode, the client begins transmitting the preamble (or other analogous indication of an ensuing message) at the start of, and until the end of, the normal time the relevant frequency of the shared frequency hopping sequence occurs based on the client's local timing. If the client is in the extended windowing mode, the client begins transmitting the message preamble prior to the start of, and beyond the end of, the normal time the relevant frequency of the shared frequency hopping sequence occurs.

It should be noted that FIGS. 3A and 3B depict functional operations, and are not intended to suggest sequential activities. For example, while it may be the case that it is first determined 302 whether the client device is in extended mode, this may be determined before, after or concurrently relative to the host sending 300 the status request, and may be performed, and may also be performed concurrently with the awakening 304/306 of the client device. FIGS. 2A and 2B similarly do not require any sequence of flow set forth in the diagram, but rather suggest functional operations. As an example, the client device may, or may not, determine 202 the scheduled communication time before the master device publishes 204 its synchronization data.

As previously indicated, certain events dictate when the client device will be in the extended windowing mode. In accordance with one embodiment, these events focus on if and how often the client device receives synchronization messages from the host device during successive sync periods. Before describing an example of the conditions used to determine if and when a device will enter or remain in the extended windowing mode, an exemplary sync period in a frequency hopping context is described in connection with FIG. 4A.

In a frequency hopping context, a plurality of frequencies are ordered into a frequency hopping sequence. For example, in a frequency hopping sequence having fifty frequencies, the frequencies $F_0$-$F_{49}$ may be rearranged into any order of the fifty frequencies. This sequence of, for example, fifty frequencies repeats itself over and over, while both the host(s) and client(s) monitor the passage of time to know which frequency is active for communication at a particular time. Every so often, a sync period is injected into the repeating frequency hopping sequence to facilitate synchronization of the communicating devices in accordance with the invention.

Figure 4A:
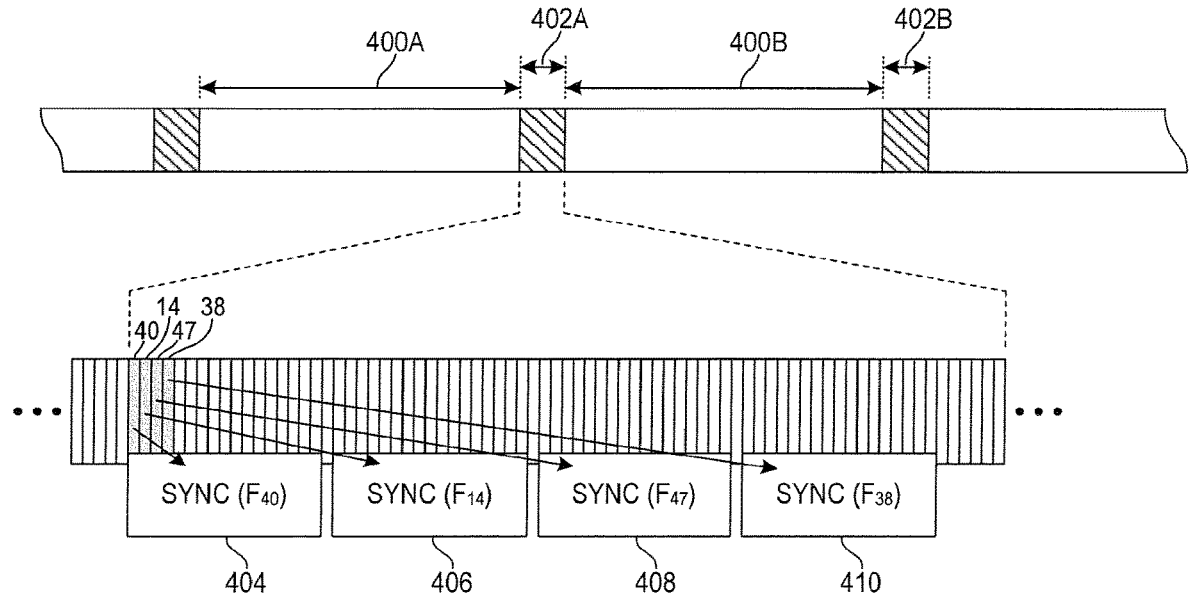
FIG. 4A illustrates an exemplary sync period in a frequency hopping context.

In FIG. 4A, segment 400A represents a first repeating sequence of frequencies, referred to herein as a "frequency sequence period." At some determined interval, such as every fifteen seconds, a synchronization (sync) period 402A occurs, which is described more fully below. After the intervening sync period 402A, the frequency hopping sequence resumes as shown in segment 400B, followed again by a sync period 402B, and so on. In one representative example, a sync period occurs every 112 frequency sequence periods plus one frequency period, although any desired periodic or non-periodic manner of providing synchronization messages may be utilized. Using, for example, a 1/4096 timer resolution example, this results in a sync period occurring approximately every fifteen seconds (approximately 61,000 ticks≈15 seconds). The exemplary sync period is divided into four equal sync message periods 404, 406, 408, 410, each 22 frequency periods long (242 ticks). In one embodiment, the frequencies used during each synchronization message period are in order of the first four frequency periods in the sync period. For example, if the first four frequencies of the sync period are $F_{40}$, $F_{14}$, $F_{47}$ and $F_{38}$, then each of the four sync message periods 404, 406, 408, 410 will respectively use frequencies $F_{40}$, $F_{14}$, $F_{47}$ and $F_{38}$. In the illustrated embodiment, the entire sync period is 88 normal frequency periods (e.g., 236 mSec).

Each of the clients operating in the system wake up to hear the sync message in one embodiment. When a client hears a sync message such as sync message 406, it may ignore the remaining sync messages 408, 410 in that sync period 402A. As previously indicated, each of the sync messages 404, 406, 408, 410 contain the host's 24-bit timer value at the time of the start of the current sync message period (i.e., the master or "host" view of current time), as well as the host's timer value at the start of the last frequency sequence.

Figure 4B:
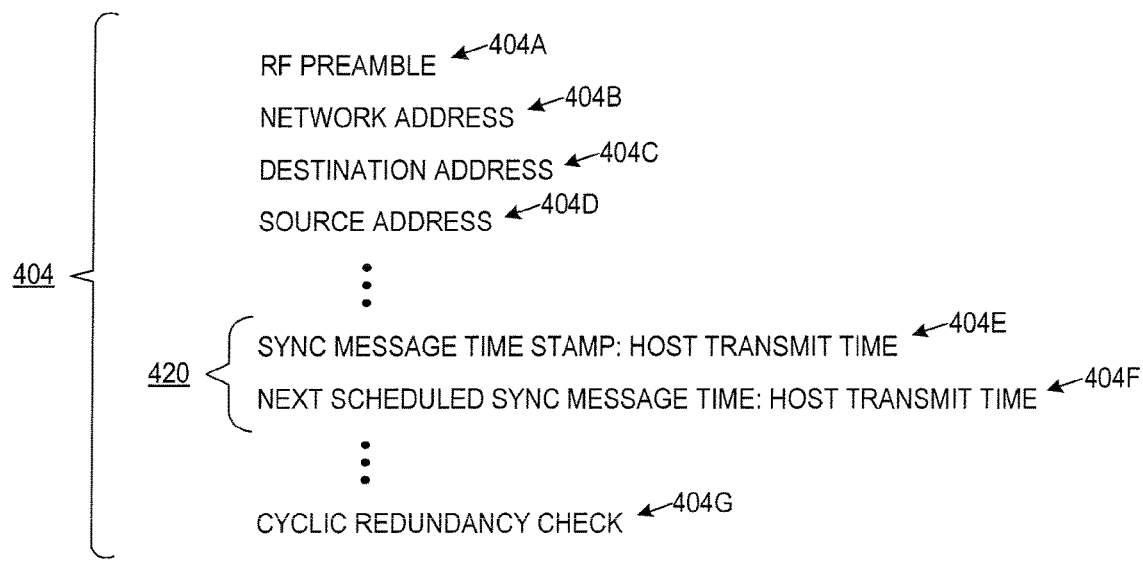
FIG. 4B illustrates an example of a portion of a representative sync message.

An example of a portion of a sync message 404 from FIG. 4A is shown in FIG. 4B. The sync message 404 may include a preamble 404A and various addresses such as the network address 404B, destination address 404C and source address 404D. As indicated above, the sync message 404 also includes synchronization information 420. One part of the information 420 is the master view of current time depicted as the synchronization message time stamp 404E taken at a particular host transmit time. Another part of the information is the host's timer value relative to the start of a frequency sequence. This may represent the host's timer value at the start of the last frequency sequence, or alternatively the next scheduled synchronization message time 404F based on the host's timer. This representative synchronization message 404 may end with a cyclic redundancy check 404G.

As indicated above, the sync message 404 may include various synchronization information, such as the master view of current time; time at the start of a frequency hopping sequence, etc. In one embodiment involving frequency hopping, there are three relevant times of which the synchronization message can provide; 1) the actual time stamp for the message that is going out; 2) the time stamp of the beginning of the most recent synchronization period; 3) the time stamp of the beginning of the most recent frequency sequence.

It should be recognized that the representative number and durations of sync period 402A shown in FIG. 4A are merely for purposes of example. As it pertains to the invention, the more relevant aspect is that synchronization information, such as the host's view of current time and the host's view of the next (or last) synchronization message time, is provided to the clients. Using such information, the clients can stay synchronized by enabling the clients to know when to begin/end listening for incoming messages and/or begin/end transmitting outgoing messages. Thus, in accordance with embodiments of the invention, the receipt of the synchronization information enables the clients to determine whether to enter the extended windowing mode in order to maintain synchronization between devices that are to communicate with one another.

As previously indicated, when the client is in the extended windowing mode (e.g., block 208 of FIG. 2A) in accordance with one embodiment of the invention, it will remain in this extended windowing mode until one or more defined events occur. FIG. 5 is a state flow diagram illustrating a representative example of how a client device enters and exits the extended windowing mode in accordance with the present invention. The following description sets forth one particular embodiment for doing so, for purposes of facilitating an understanding of this aspect of the invention. However, those skilled in the art will readily appreciate that this aspect of the invention is equally applicable to other desired design parameters.

In this representative embodiment described in connection with FIG. 5, it is assumed that each of the client devices implements a hardware timer with 1/4096 second resolution, although any selected resolution may be implemented according to the particular design. One embodiment involves each client device remaining within one timer tick count of its master/host. For example, where the host and client communicate using a common frequency hopping sequence, the host and client timers may need to remain within one clock period or "tick" of one another so that both devices are communicating on the same frequency at the substantially the same time.

In order to maintain such a timing relationship between communicating devices, one device such as the host may send one or more synchronization messages to client devices in a dedicated block of time referred to herein as a synchronization (or sync) period. In one particular embodiment, the host transmits four synchronization messages in the sync period as was also illustrated in connection with FIG. 4A. Issuing multiple synchronization messages in each sync period increases the chance of client devices perceiving one of the synchronization messages.

The sync period may be designed to occur as often as desired, and in one embodiment occurs approximately every 61,000 clock ticks (≈15 seconds) based on a 1/4096 second resolution timer. When a client recognizes one of the synchronization messages, it may ignore the remaining synchronization messages in the sync period. However, in one embodiment, clients may still operate correctly even if they miss all the sync messages in 2 consecutive sync periods. In an embodiment requiring each client device to stay within one timer tick count of its host, each client must maintain +/− one timer tick accuracy for approximately 45 seconds (approximately 15 seconds times three sync periods).

For purposes of illustration, assume client hardware timers with 1/4096 second resolution that utilize crystal oscillators having |50, +130 parts per million (PPM) accuracy over the operating temperature range. Assuming the foregoing, after three sync periods (approximately 45 seconds), the most that any of the timers should deviate is shown in the representative example equation below:

$$((50+130)/10^6)*3*61611 = +/-33 \text{ ticks} \qquad \text{(EQUATION 1)}$$

As indicated above, design parameters may suggest or require that the host and client timers be within some established number of clock ticks, such as one clock tick in the above representative example.

Where the host and client timers are to remain within one clock tick of one another, one embodiment involves each of the client devices adjusting for the difference between its timer and its respective host's timer. This can be done, for example, by calculating a compensation factor using information from at least two synchronization messages. With each synchronization message received thereafter, the client can iterate to make the compensation factor increasingly more accurate.

Each client initially becomes associated with a master, also referred to herein as a host. In one embodiment, a client becomes associated with its host through an enrollment or "binding" process. An enrollment process enables the enrolling device(s) to be made known to the host, and vice-versa. For example, devices that are known to be in the same system may be allowed to communicate with one another, relative to other devices that have not (or are not suppose to) enroll with the host. More particularly, devices in a system, and especially systems involving one or more wireless devices, may join or leave the system or network of devices at various times. One time is during initial installation, where some or all of the devices may undergo such an enrollment or binding process which allows devices to learn about each other so they can cooperate, such as communicate with one another, obtain authorization to communicate with one another, etc. Other devices may join the system after initial installation, such as when a new device is installed in the system, at which time this new device(s) can be enrolled in the system. In the context of wireless devices, devices may need to gain knowledge of the address(es) of other wireless devices that they can communicate with. This address or other information allows sending devices to address intended recipient devices correctly, and allows receiving devices to reject information from neighboring devices that are within the wireless communication range but not part of the particular system. Devices can be made aware of each other, and consequently each other's address, through a process of "binding" where information particular to each device is exchanged. A bound set of communication devices know the particular information of the other devices, and know which devices from which it should accept messages. This binding process is described for purposes of illustration only, as any desired enrollment or binding process may be utilized in connection with the present invention.

A client's initial synchronization message is typically received outside of the sync period when the client enrolls, and if/when it later loses synchronization and must regain it. An inaccurate compensation factor will result if the duration between synchronization messages is too small. Therefore, in one embodiment, the client does not use the initial synchronization message in the compensation calculation, and when synchronized it ignores any synchronization messages that are not in a sync period. In such an embodiment, this guarantees at least 15 seconds between synchronization messages.

In accordance with one embodiment of the invention, a client device may be in one of three states, including 1) unsynchronized; 2) synchronized but uncompensated; and 3) synchronized and compensated. An example of this embodiment is provided in FIG. 5, which depicts a state diagram of three exemplary synchronization states and associated actions.

A first state for a client device(s) is shown as the unsynchronized 500 state. A client device will typically be unsynchronized in its "out of the box" condition; i.e., prior to its enrollment to the system. The device may also be unsynchronized at other times, such as when it is being replaced by a replacement device, when it specifically queries for synchronization, battery replacement or other power loss/interruption, or when it otherwise loses its synchronization with its host.

When the device is in the unsynchronized state 500, it will at some point receive 502 a synchronization message during a sync period. In one embodiment, this first synchronization message is not used in the ensuing compensation calculation, as described more fully below. The client device will request synchronization information from the host or otherwise receive such synchronization information from the host. The synchronization information provided in the synchronization message 502 may include, for example, the time at which a synchronization will take (or had taken) place, and the host's view of current time. When the client receives this information, its local timer will begin timing for the next synchronization, and the client/host will at least temporarily be deemed synchronized, but "uncompensated." It is assumed to be uncompensated (but not necessarily so) because the client and host devices have separate timers operating, which may operate at slightly different speeds due at least to the potential PPM accuracy deviations. When the client device is in this state, the extended windowing mode is applied in accordance with the present invention.

When a client device is in the synchronized but uncompensated state 504, it might not meet the accuracy requirement of being within +/−1 tick of the host, and may be as much as +/−33 ticks off, based on the −50, +130 PPM accuracy example described above. Communications between the host and client may still occur, but in accordance with the invention the client can adjust its timing for the possible inaccuracies that may result in less efficient use of power and bandwidth. Assuming the −50, +130 PPM accuracy example, while a client is in the synchronized but uncompensated state, the client will turn on its receiver or otherwise begin monitoring for incoming messages at least 33 ticks earlier than it normally would, and will leave its receiver on or otherwise continue listening at least 33 ticks longer than it normally would. The extended listening window is thus 33 ticks at each of the beginning and end of the time the local timer in the client device suggests the message receipt time to be. As will be readily apparent to those skilled in the art, the actual extended window in which the client will listen depends on the calculation in Equation 1.

As an example, assume the client device will awake to listen for any incoming messages when a frequency in its receiver frequency hopping sequence reaches the same frequency in which the host device will transmit a message to the client. Also assume that the "extended window" is 33 ticks prior to and another 33 ticks following the duration that the relevant frequency of the frequency hopping sequence is calculated to be active in the client device based on the client device's local timer. While in the synchronized but uncompensated state 504, the client device will turn on its receiver at least 33 ticks early using the same frequency that it would use at the normal time, and will leave its receiver on at that same frequency at least 33 ticks longer than it normally would. In this manner, the client will be listening for a duration that accounts for the potential deviation between the client and transmitting host's respective timers.

In one embodiment, the extended window process is also applied to messages transmitted from the client. Particularly, the preamble in client-sent messages will start at least 33 ticks early, and will end at least 33 ticks later, than the normal duration of the preamble based on what is directed by the client's own local timer. As an example, again assume the same PPM accuracy, and that the implementation involves one or more frequency hopping sequences. In this example, the preamble in all client sent messages whose start time is determined by the host's hop sequence will start at least 33 ticks early using the same frequency that it would use at the normal time, and the preamble in all client sent messages whose start time is determined by the host's hop sequence will end at least 33 ticks later than when it normally would. In yet another particular embodiment, the requirement of extending the preamble in connection with client-sent messages takes priority over extending the listening window for received messages.

In another embodiment, a guard band is implemented, which ensures that a client does not start sending a message if it would extend into the sync period. In accordance with one embodiment of the invention, the extended window impacts the determination of whether a message can be initiated by a client in view of the guard band. For example, the client's guard band is extended to be 33 ticks (using the previous example) earlier than, and 33 ticks later than, it normally would. In yet another particular embodiment, the requirement of extending the window for the guard band takes priority over the requirements of extending the preamble in connection with client-sent messages and extending the listening window for received messages.

The particular client device will remain in the synchronized but uncompensated state 504, while applying the dynamic extended windowing process in accordance with the invention, until the client device qualifies to enter the "synchronized and compensated" state 506, or returns to an "unsynchronized" state 500. In one embodiment, the device may return to the unsynchronized state 500 in any one of a plurality of manners. For example, if the client device encounters three consecutive sync periods without receiving a sync message as shown at block 508, it is returned to the unsynchronized state 500 where the client will again request or otherwise receive a sync message and will start the process anew. The number "three" sync periods may differ in different designs, and is set to three in the present example based on the exemplary PPM accuracy of the oscillators, the representative requirement that the device stay within one tick count of its host, and that the client may still operate correctly even if it misses all the sync messages in 2 consecutive sync periods. Other examples in which the device may return to the unsynchronized state 500 include the device transmitting a query for synchronization as shown at block 510, and/or the device unenrolling 512 from its host.

If the particular client device receives 514 three or more consecutive synchronization messages in the present example, excluding the first synchronization message 502 received when originally in the unsynchronized state 500, it will be considered to be "synchronized" and enters the synchronized and compensated state 506. In this state, the extended windowing process described in connection with the synchronized but uncompensated state 504 is discontinued. In other words, the client device will not monitor for incoming messages earlier and later than its local timer suggests, it will not begin transmitting its preamble earlier and continuing the preamble transmission beyond what its local timer suggests when transmitting messages, and it will not extend the guard band beyond what its local timer suggests. Thus, in the illustrated embodiment, the client device implements the extended windowing process while in the synchronized but uncompensated state 504, and does not extend its normal listening/transmitting durations while in the synchronized and compensated state 506. Among other things, this enables the client device to save energy, which is particularly beneficial for battery-operated client devices.

The client device remains in the synchronized and compensated state 506 until the device unenrolls 516, sends a query for synchronization 518, or until three (in the present example) consecutive sync periods occur without receiving a synchronization message 520. If any of these events 516, 518, 520 and/or other established events occur, the device returns to the unsynchronized state 500 where the process starts anew.

Figure 6:
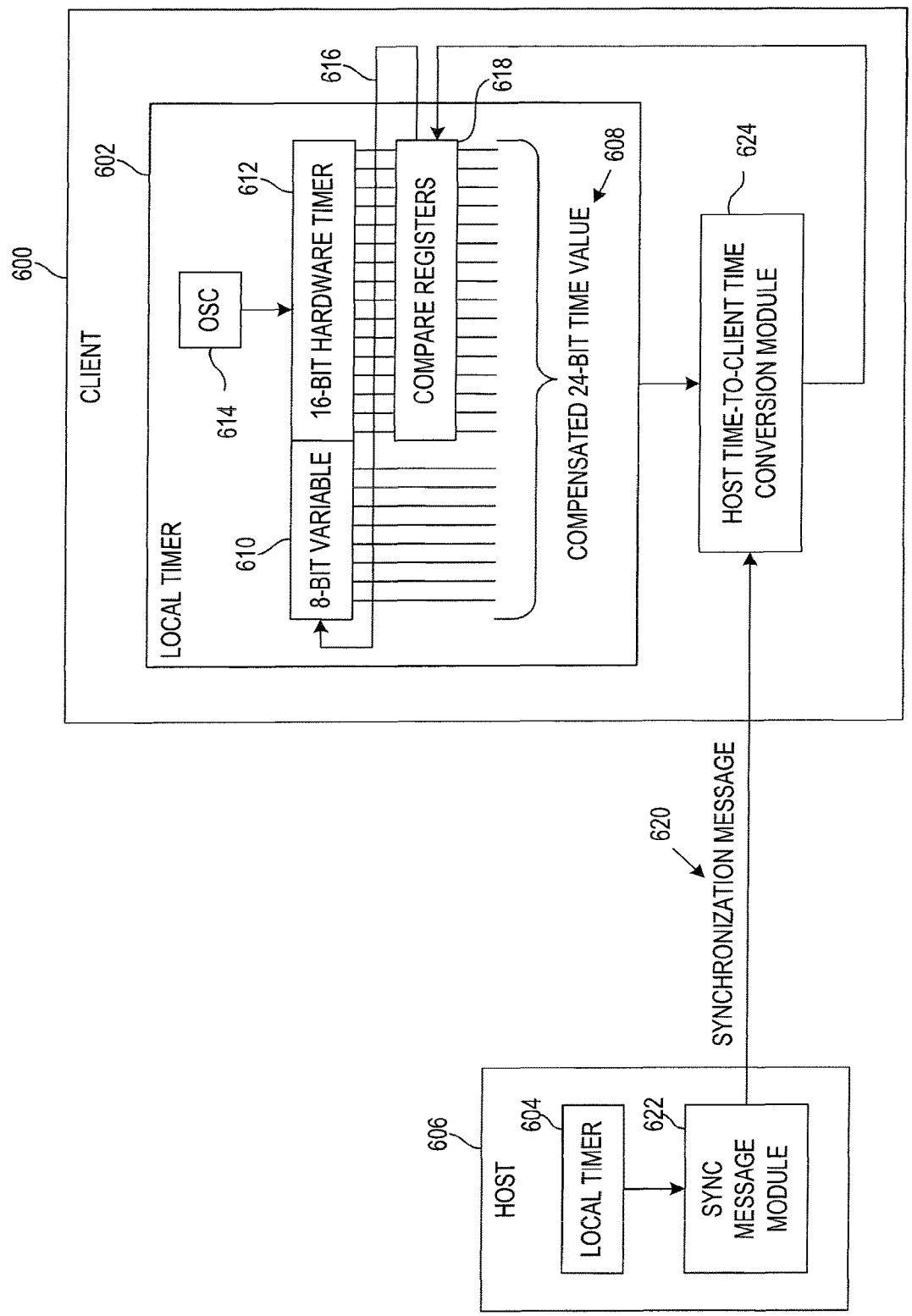
FIG. 6 illustrates a representative compensation process whereby a client device iterates to make a compensation factor increasingly more accurate in accordance with one embodiment of the invention.

As indicated above, one embodiment involves maintaining the host and client timers within some established time relative to one another, such as within one clock tick of each other. The client devices may adjust for the difference between its timer and its respective host's timer by, for example, calculating a compensation factor using information from at least two synchronization messages. With each synchronization message received thereafter, the client can iterate to make the compensation factor increasingly more accurate. A representative compensation process is described below, and in connection with FIG. 6. It should be recognized that the example of FIG. 6 is provided for purposes of facilitating an understanding of how such a compensation algorithm may allow a client device 600 to adjust for the difference between its local timer 602 and the timer 604 of its host 606, however other compensation algorithms may be analogously implemented.

In this example, client time is represented as a 24-bit value 608, using an 8-bit variable 610 for the most significant bits (MSBs) and a 16-bit hardware timer 612 with 1/4096 second resolution for the least significant bits (LSBs). At least the hardware timer 612 receives clock pulses/ticks from its oscillator (OSC) 614. Each overflow of the hardware timer 612 (approximately every 16 seconds in the present example) generates an interrupt 616 that increments the 8-bit variable 610. The hardware timer 612 utilizes several compare registers 618 that generates interrupts 616 at particular times, up to approximately 16 seconds in the future. When a synchronization message 620 is received from the host's 606 synchronization message module 622, the 24-bit time 608 in the client 600 could be changed to match the host's timer 604. However this would involve changing the hardware timer value 612, and when that is changed, any compare values that had previously been set become invalid. Instead of adding special software to also change the compare values, the hardware timer value 612 need not be changed in embodiments of the present invention. Rather, the client device's timer 602 continues to run unmodified when synchronization occurs, whereby the client 600 refers to any future time in terms of the host's time 604, and performs a hardware, firmware and/or software calculation 624 to convert host time 604 to its own time 608 in order to set its timer compare registers.

In one embodiment, when a client receives a sync message, it does not make adjustments to an existing compare register; however it uses the new information to set any new compare registers. As long as the compensated timer error at the start of the previous sync period was within 1 tick, any compare registers settings are still valid after a new sync period. After the transition from the "Unsynchronized" state 500 (FIG. 5) to the "Synchronized but Uncompensated" state 504 (FIG. 5), the device is accurate to within one tick after two more sync periods, however the compare register may be inaccurate. This is why, in one embodiment, the client does not transition to the "Synchronized and Compensated" state until it gets the third sync period 514 (FIG. 5).

The functions associated with the present invention may be performed by discrete circuitry and/or computing system hardware. In one embodiment, the devices that will communicate with one another utilize a processor(s), CPU(s), computer(s), or other processing system to perform the stated functions. Accordingly, hardware, firmware, software or any combination thereof may be used to perform the various functions and operations described herein.

Figure 7:
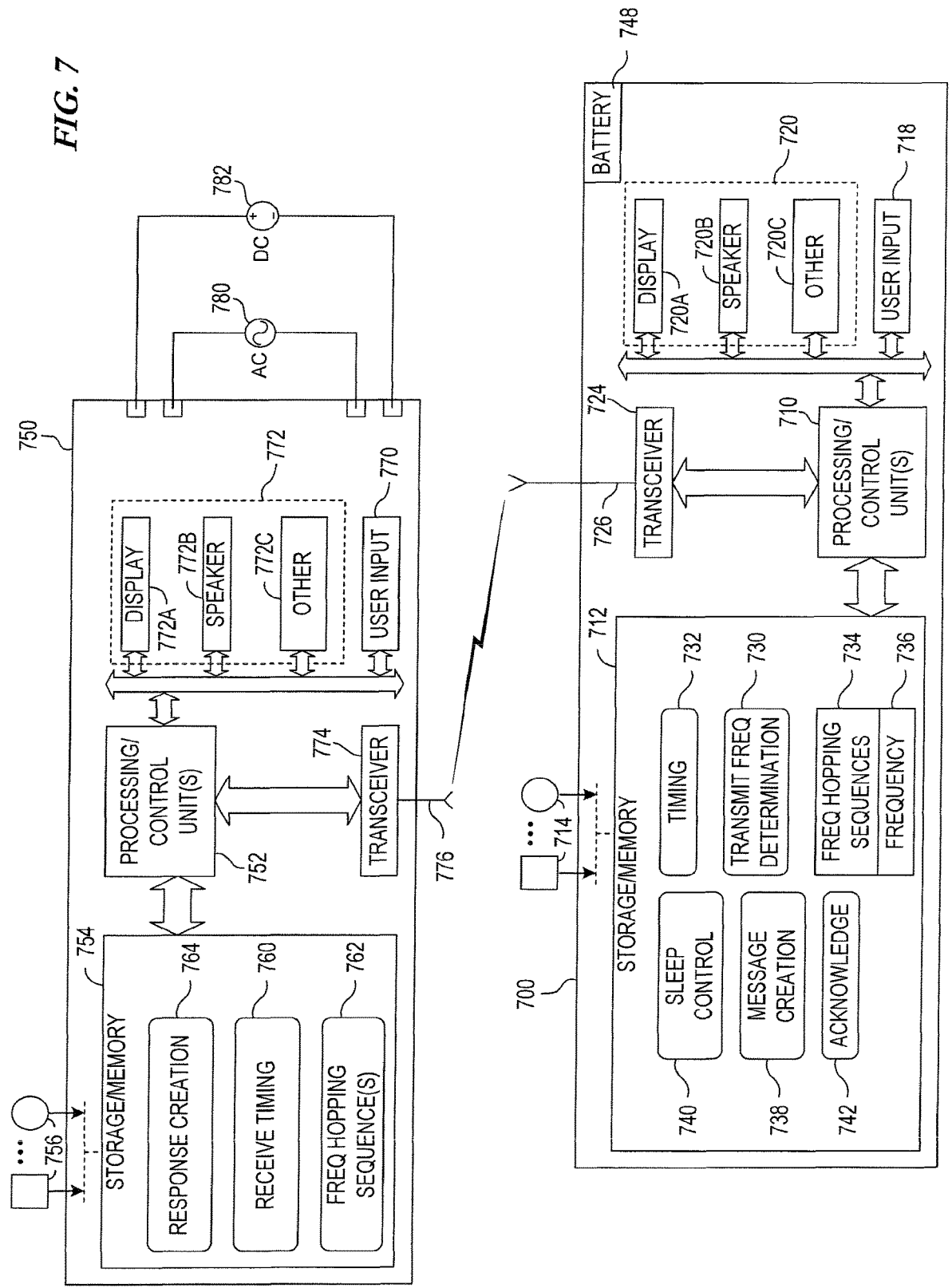
FIG. 7 illustrates representative processing arrangements for a communicating pair of devices.

Representative processing arrangements for a communicating pair of devices 700, 750 is illustrated in FIG. 7. The device 700 represents any transmitting device capable of performing the communication functions previously described, such as sending a message to or receiving a message from another device 750. A device may be both a transmitting and receiving device, and a device referred to herein as a transmitting or receiving device is based on whether it is operating as a transmitter or receiver for purposes of that description. In the illustrated embodiment, the device 700 represents a client device that is capable of communicating over the air, such as by radio frequency (RF) communications. By way of example and not of limitation, the device 700 may represent communication portions of a thermostat, sensor, remote control, damper, humidifier, dehumidifier, etc.

The representative device 700 implements computing/processing systems to control and manage the conventional device activity as well as the device functionality provided by the present invention. For example, the representative device 700 includes a processing/control unit 710, such as a microprocessor, controller, reduced instruction set computer (RISC), central processing module, etc. The processing unit 710 need not be a single device, and may include one or more processors. For example, the processing unit may include a master processor and one or more associated slave processors coupled to communicate with the master processor.

The processing unit 710 controls the basic functions of the device 700 as dictated by programs available in the program storage/memory 712. The storage/memory 712 may include an operating system and/or various program and data modules associated with the present invention. In one embodiment of the invention, the programs are stored in non-volatile storage/memory so that the programs are not lost upon power down of the device. The storage 712 may also represent one or more of other types of read-only memory (ROM) and programmable and/or erasable ROM, random access memory (RAM), subscriber interface module (SIM), wireless interface module (WIM), smart card, or other fixed or removable memory device/media. The storage 712 may also include removable media 714 (e.g. disk, CD-ROM, DVD, etc.) that can be read via the appropriate interfaces and/or by appropriate media drives. The relevant software for carrying out device operations may be provided to the device 700 via any such storage media, or may be transmitted to the device 700 via data signals such as by way of a network.

For performing other device functions, the processor 710 may be coupled to user input interface 718 associated with the device 700. The user input interface 718 may include, for example, a keypad, function buttons, joystick, scrolling mechanism (e.g., mouse, trackball), touch pad/screen, and/or other user entry mechanisms. A user interface (UI) 720 may be provided, which allows the user of the device 700 to perceive information visually, audibly, through touch, etc. For example, a display 720A and/or speaker 720B may be associated with the device 700. Other user interface (UI) mechanisms 720C can also or alternatively be provided.

The processor 710 is also coupled to a transceiver 724, which represents either a transceiver or discrete transmitter and receiver components. The transceiver 724 is configured to communicate RF signals, including communicating RF signals using frequency hopping as described herein. The transceiver 724 is coupled to an antenna 726.

In one embodiment, the storage/memory 712 stores the various client programs and data used in connection with the present invention. For example, a transmit frequency determination module 730 can be provided for a transmitting device to identify the frequency at which it will next transmit a message. A timing module 732 may determine when the next transmission frequency becomes active in the relevant frequency hopping sequence, and/or perform other timing functions such as those associated with the timing module 114 of FIG. 1. One or more frequency hopping sequences 734 as described herein may be stored in the storage 712, as may other data such as the frequency 736 at which a message was sent so that the same frequency can be monitored for incoming acknowledgement signals, responses, etc. In some embodiments the stored frequency(s) 736 may also store the last frequency used by the device 700 to transmit or receive a message, so that the next frequency in the frequency hopping sequence may be used to send or receive a subsequent message.

The storage may also store program modules to enable the device 700 to perform other functions in accordance with the invention. For example, the storage/memory 712 may include a message creation module 738 that formulates a query or other message for transmission to a host or other target device 750. A sleep control module 740 controls functional units and/or other components of the device 700 in order to at least conserve power consumption. For example, the sleep control module 740 may be configured to turn off the transceiver 724 or the transmitting or receiving portions thereof. The sleep control module 740 can be configured to reduce or temporarily suspend any other desired functional operation and/or component of the device 700 to conserve local resources.

Still other modules may include an acknowledge module 742, which can recognize acknowledgement signals from another device 750, and/or create acknowledgement signals to return to another device 750 to notify it that a response or other message has been received. For example, the acknowledge module 742 can recognize receipt of an acknowledgement signal from another device by, for example, parsing a received message and determining from header information and/or the message body that it is an acknowledgement signal for the transmitted message. In another particular embodiment, the acknowledge module 742 can formulate the header information and message body to create an acknowledgement message to be transmitted to the responding device 750 to notify the responding device 750 that the device 700 received a message (i.e. response message) in response to an inquiry or other message.

These and other modules may be separate modules operable with the processor 710, may be a single module performing each of these functions, or may include a plurality of such modules performing the various functions. While the modules are shown as multiple software/firmware modules, they may or may not reside in the same software/firmware program. It should also be recognized that one or more of these functions may be performed using discrete hardware. These modules are representative of the types of functional modules that may be associated with a device in accordance with the invention, and are not intended to represent an exhaustive list. Also, other described functions not specifically shown may be implemented by the processor 710.

FIG. 7 also depicts a representative receiving device 750 that is the targeted device of a message sent from the device 700, or the source of a message directed to the device 700. In one embodiment, the target device 750 represents the communication portions of a host device, such as thermostats, equipment interfaces, zoning panels, etc. The illustrated device 750 includes circuitry analogous to that of device 700, and similarly includes a processor 752 and storage/memory 754. In accordance with one embodiment, the storage/memory 754 and/or media devices 756 store the various programs and data used in connection with the invention. For example, the storage 754 may include a receive timing module 760 that is configured to determine when a frequency in its shared frequency hopping sequence is active; i.e. what frequency is being listened to, and when. Stated alternatively, the receive timing module 760 identifies an active frequency in the frequency hopping sequence (shared with the device 700) in which to monitor for incoming messages. The storage 754 can store at least a receiver frequency hopping sequence 762, although it may also store a transmitter frequency hopping sequence (not shown) if it is also a transmitting device. The device 750 may also include other modules, such as a response creation module 764 that formulates a response message to respond to a query or other message from an initiating device 700. For example, if the device 700 transmits a query to the host 750 to receive a synchronization message, the response creation module can formulate the appropriate synchronization message, analogous to the sync message module 622 described in connection with FIG. 6.

The device 750 may also include other components or modules for performing other device functions, such as a user input interface 770. The user input interface 770 may include, for example, a keypad, function buttons, joystick, scrolling mechanism (e.g., mouse, trackball), touch pad/screen, and/or other user entry mechanisms. Other components may include a user interface (UI) 772, which allows the user of the device 750 to perceive information visually, audibly, through touch, etc. For example, a display 772A and/or speaker 772B may be associated with the device 750. Other user interface (UI) mechanisms 772C can also or alternatively be provided. The illustrated processor 752 is also coupled to a transceiver 774 (which may represent discrete transmitter and/or receiver components) configured to transmit and receive RF signals using frequency hopping as described herein. The transceiver 774 is coupled to an antenna 776.

The devices 700, 750 may be powered in any desired fashion. In one embodiment, the device 700 is battery 748 powered, and the sleep control module 740 controls components such as the transceiver 724 in order to conserve power and increase the useable life of the battery 748. The device 750 is not battery powered in the illustrated embodiment, but rather is powered by an external source such as an AC power source 780 or DC power source 782.

The functions described in connection with the invention may be used in any device in which data is to be communicated. In one embodiment, the systems, apparatuses and methods of the invention are implemented in environmental monitoring and control systems, such as HVAC systems. Representative examples of such systems are generally described below. However, it should be recognized that the aforementioned systems, apparatuses and methods may be used in any communication device and associated system.

Environmental control systems can monitor and control numerous environmental and safety devices. These devices include, for example, thermostats, HVAC modules, equipment interfaces, sensors, remote controls, zoning panels, dampers, humidifiers and dehumidifiers, etc. It may be beneficial for some or all of these devices to communicate with each other wirelessly, which significantly eases installation and wiring complications. Wireless units also provide users with flexibility of use, and more options in positioning the devices. These and other advantages of implementing air interfaces have led to the use of the wireless transmission of some data in HVAC systems.

Figure 8:
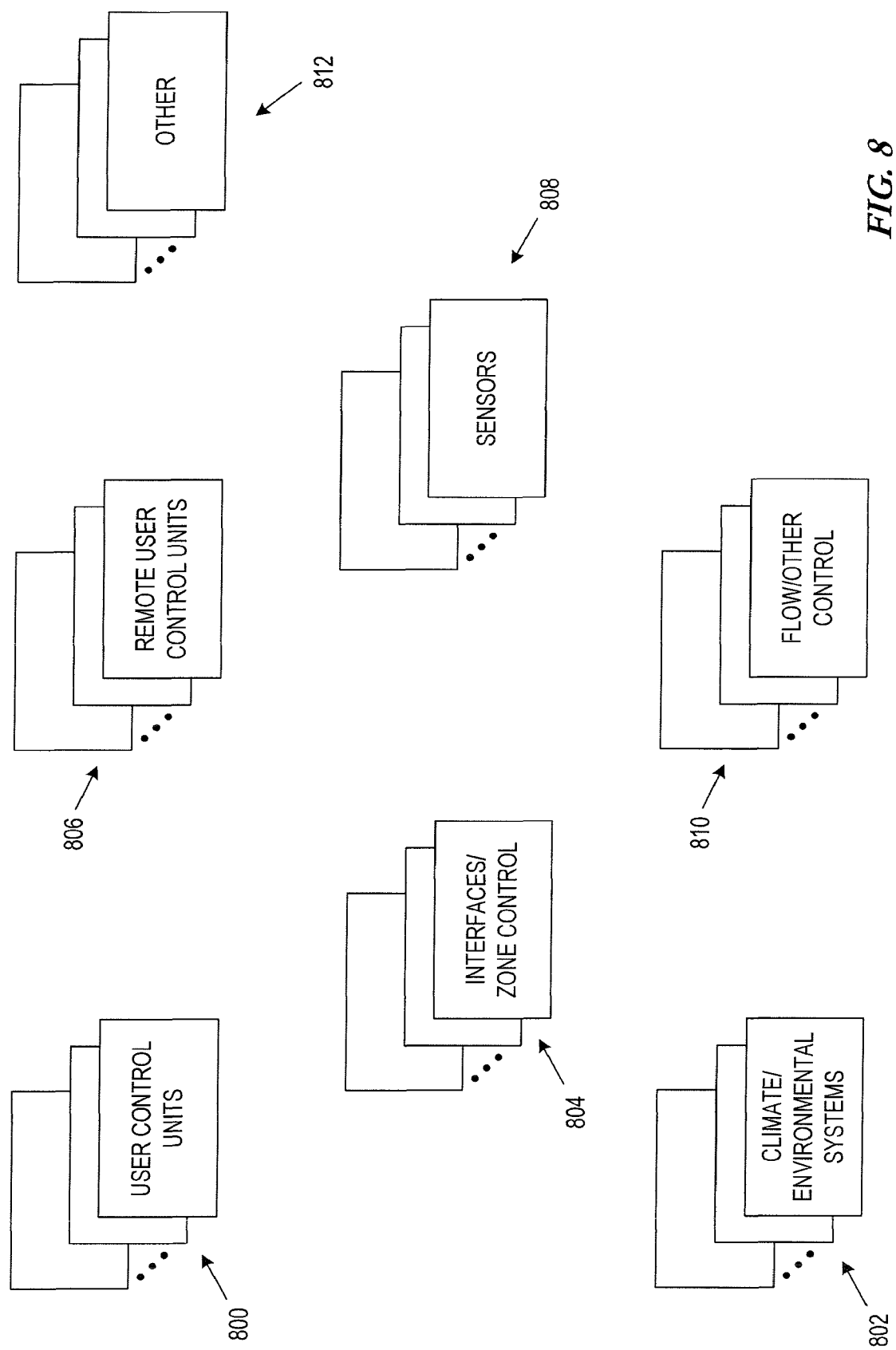
FIG. 8 is a block diagram generally illustrating representative HVAC elements and devices in which principles of the present invention may be applied.

FIG. 8 is a block diagram generally illustrating representative HVAC elements and devices in which air interfaces may be used. FIG. 8 depicts one or more user control units 800, such as wireless thermostats where users can enter a temperature setpoint designating a desired temperature. Other examples of user control units 800 include humidity control units, lighting control units, security control units, etc. Climate or environmental systems 802 may include the equipment to cause the desired action to occur. One such system 802 is an HVAC system, which includes equipment to raise or lower temperature, humidity, etc. User control units 800 may communicate directly with such climate/environmental systems 802, and/or may communicate via one or more interfaces or zone controllers 804. Remote user control units 806 provide portable user control, such as providing a visual and/or audio interface to the user, and allowing the user to change environmental setpoints, check status, etc. Sensors 808 may be used to sense environmental conditions, and may be discrete devices (e.g. outdoor air/temperature sensor) or may be integrated into user control units 800. Flow and other control equipment 810 may also be used, such as dampers, ultraviolet air treatment lamps, etc. Any of these devices may need to communicate information amongst themselves and/or with other devices 812, in which the present invention may be utilized.

When these devices communicate wirelessly with one another via radio frequency (RF) or other wireless means, there is a reasonable chance that a wirelessly communicating device may experience interference from neighboring systems or other devices of the same system. Using frequency hopping can significantly reduce such interference. Communicating via frequency hopping sequences as described herein enables, among other things, multiple devices to communicate in an orderly fashion while addressing interference issues.

Some devices in the system may be powered by power sources and communicate via wire and/or over the air, while other devices may be battery-powered and communicate information wirelessly. In one embodiment, devices that are powered by power sources, such as 24 volts AC (VAC), may be referred to herein as hosts, and may remain powered on while operating in the system. Other devices that are powered by battery may be referred to herein as clients, and may enter a sleep mode to preserve battery life. A collection of devices including a host(s) and its clients may be referred to as a group, and a collection of physical groups that communicate through their host(s) may be referred to as a system. However, a system as otherwise used herein does not require any such groupings, and may involve as few as two communicating devices.

Figure 9A:
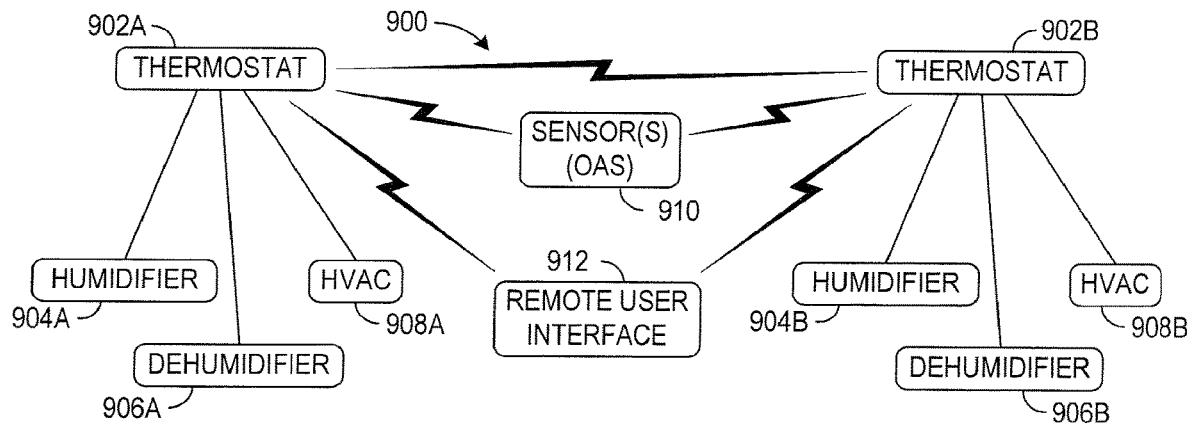
FIGS. 9A-9C depict some representative examples of clients, hosts, groups and systems that may benefit from principles of the invention.
Figure 9B:
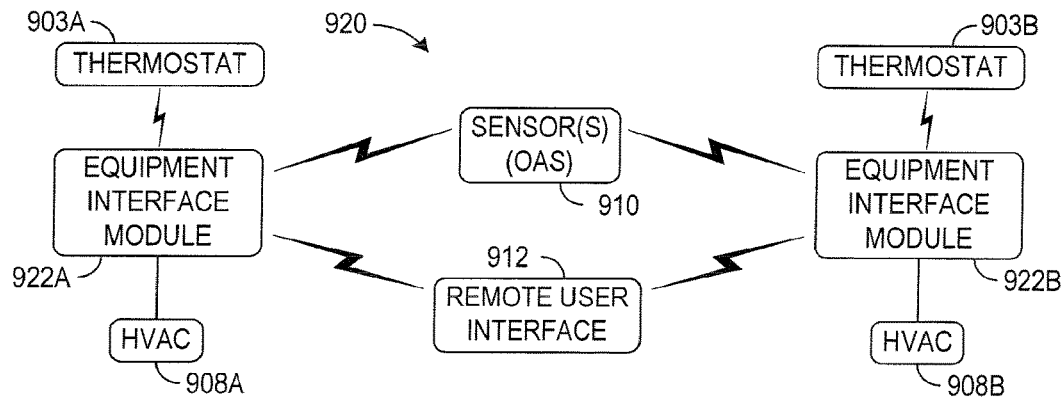
Figure 9C:
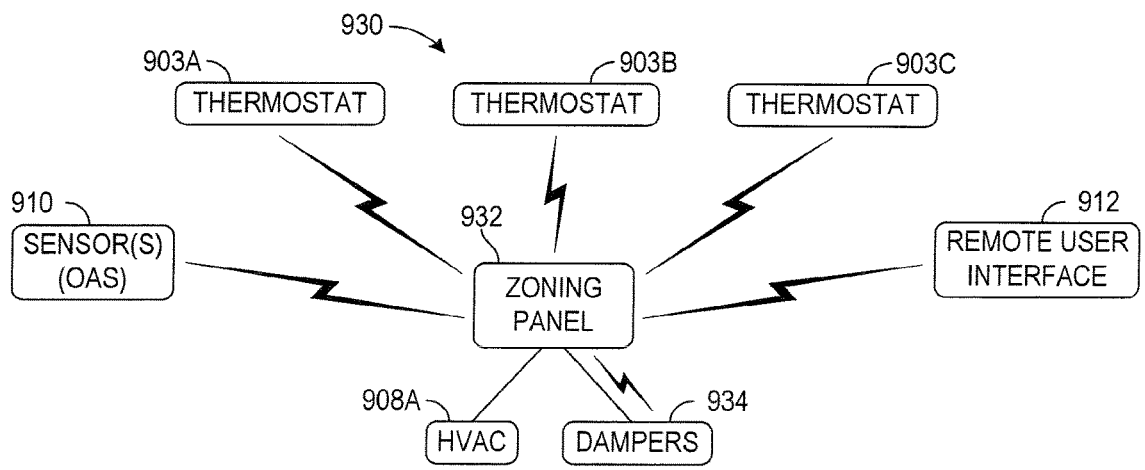

FIGS. 9A-9C depict some representative examples of clients, hosts, groups and systems that may benefit from principles of the invention. Like reference numbers are used for analogous devices where appropriate in FIGS. 9A-9C. Each of the devices depicted in FIGS. 9A-9C may be powered in any desired manner, such as via an AC power source, battery or other DC power source, employing energy harvesting such as solar cells, etc. Thus, the examples below that reference possible power sources for various devices are merely representative embodiments for purposes of illustration.

FIG. 9A illustrates one system 900 where one or more thermostats 902A, 902B are configured as hosts, and may be powered by an AC power source, DC source or other power source. Each thermostat 902A, 902B may be wired to other equipment such as humidifiers 904A, 904B, dehumidifiers 906A, 906B, and HVAC equipment 908A, 908B respectively. Battery powered clients in the embodiment of FIG. 9A include one or more sensors 910, such as an outdoor air sensor (OAS), and one or more remote user interfaces (RUI) 912 which provide users with remote access and control of environmental conditions in the system 900. In accordance with one embodiment of the invention, clients such as the RUI 912 can receive synchronization messages from a host device such as the thermostat 902A or 902B.

FIG. 9B illustrates another exemplary system 920 where one or more thermostats 903A, 903B are configured as clients, and may be powered by batteries. Each thermostat 903A, 903B respectively communicates wirelessly with an equipment interface module (EM) 922A, 922B that may be AC-powered and wired to respective HVAC equipment 908A, 908B. In this embodiment, each EIM 922A, 922B operates as a host and communicates with various clients. For example, host EIM 922A can communicate wirelessly with clients including the thermostat 903A, the sensor(s) 910, and the RUI(s) 912. Similarly host EIM 922B can communicate wirelessly with clients including the thermostat 903B, the sensor(s) 910, and the RUI(s) 912. In accordance with the invention, clients such as the thermostat 903A can receive synchronization messages from a host device such as the EIM 922A.

FIG. 9C illustrates another system 930 which utilizes area zoning using a zoning panel 932. In this embodiment, the zoning panel 932 serves as a host that may be AC-powered. The zoning panel 932 of FIG. 9C is connected to other equipment such as the HVAC 908A and dampers 934. Clients include the thermostats 903A, 903B, 903C, sensor(s) 910, RUI 912, and possibly dampers 934 when such dampers are wirelessly controlled. In accordance with the invention, clients such as any of the thermostats 903A/B/C can receive synchronization messages from a host such as the zoning panel 932.

It should be noted that the exemplary environments described in FIGS. 8 and 9A-9C are provided merely for purposes of facilitating an understanding of representative systems in which the principles of the present invention may be employed. From the description provided herein, one skilled in the art can readily appreciate that the invention may be employed in any system of two or more communicating devices.

Using the description provided herein, the invention may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the invention. As such, terms such as "modules" and the like as used herein are intended to include a processor-executable program that exists permanently or temporarily on any computer-usable medium or in any transmitting medium which transmits such a program. Such "modules" may also be implemented using discrete circuits.

As indicated above, memory/storage devices include, but are not limited to, disks, optical disks, removable memory devices such as smart cards, SIMs, WIMs, semiconductor memories such as RAM, ROM, PROMS, etc. Transmitting mediums in which programs can be provided include, but are not limited to, transmissions via wireless/radio wave communication networks, the Internet, intranets, telephone/modem-based network communication, hard-wired/cabled communication network, satellite communication, and other stationary or mobile network systems/communication links.

The foregoing description of exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined in view of what would be apparent to those skilled in the art from the description provided herein and the claims appended hereto.

What is claimed is:

1. A method comprising:
   receiving a first synchronization message from a remote device, wherein the synchronization message comprises an indication of a time at the remote device;
   maintaining, by a local device, a time of the local device;
   at a first instance, in response to determining that the time at the remote device does not differ from the time of the local device by at least an established amount, communicating with the remote device using a non-extended communication window, wherein the non-extended communication window defines a first duration of time during which communications signals can be communicated between the remote device and the local device;
   at a second instance, receiving a time value from the remote device;
   comparing the received time value from the remote device to the local time value;
   determining that a difference between the received time value and the local time value is at least the established amount; and
   in response to determining that the difference between the received time value and the local time value is at least the established amount, communicating with the remote device using an extended communication window, wherein the extended communication window defines a second duration of time during which communications signals can be communicated between the remote device and the local device, wherein the second duration of time is longer than the first duration of time such that the extended communication window has a longer duration than the non-extended communication window.

2. The method of claim 1, wherein the extended communication window entirely overlaps the non-extended communication window.

3. The method of claim 2, wherein the extended communication window starts before the non-extended communication window.

4. The method of claim 2, wherein the extended communication window ends after the non-extended communication window.

5. The method of claim 2, wherein the extended communication window starts before and ends after the non-extended communication window.

6. The method of claim 1, further comprising:
in response to determining that the time at the remote device does not differ from the time of the local device by at least the established amount, using subsequent communications signals communicated during the extended communication window to calibrate the time of the local device with the time at the remote device.

7. The method of claim 6, further comprising:
after calibrating the time of the local device with the time at the remote device, returning to using the non-extended communication window during which communications signals can be communicated between the remote device and the local device.

8. The method of claim 1, wherein using the extended communication window comprises:
- initiating monitoring for incoming signals from the remote device at a time earlier than the non-extended communication window would begin;
- discontinuing monitoring for incoming signals from the remote device at a time later than the non-extended communication window would end;
- initiating transmission of a message preamble for outgoing signals to the remote device at a time earlier than the non-extended communication window would begin; and
- discontinuing transmission of the message preamble to the remote device at a time later than the non-extended communication window would end.

* * * * *